Feb. 13, 1968

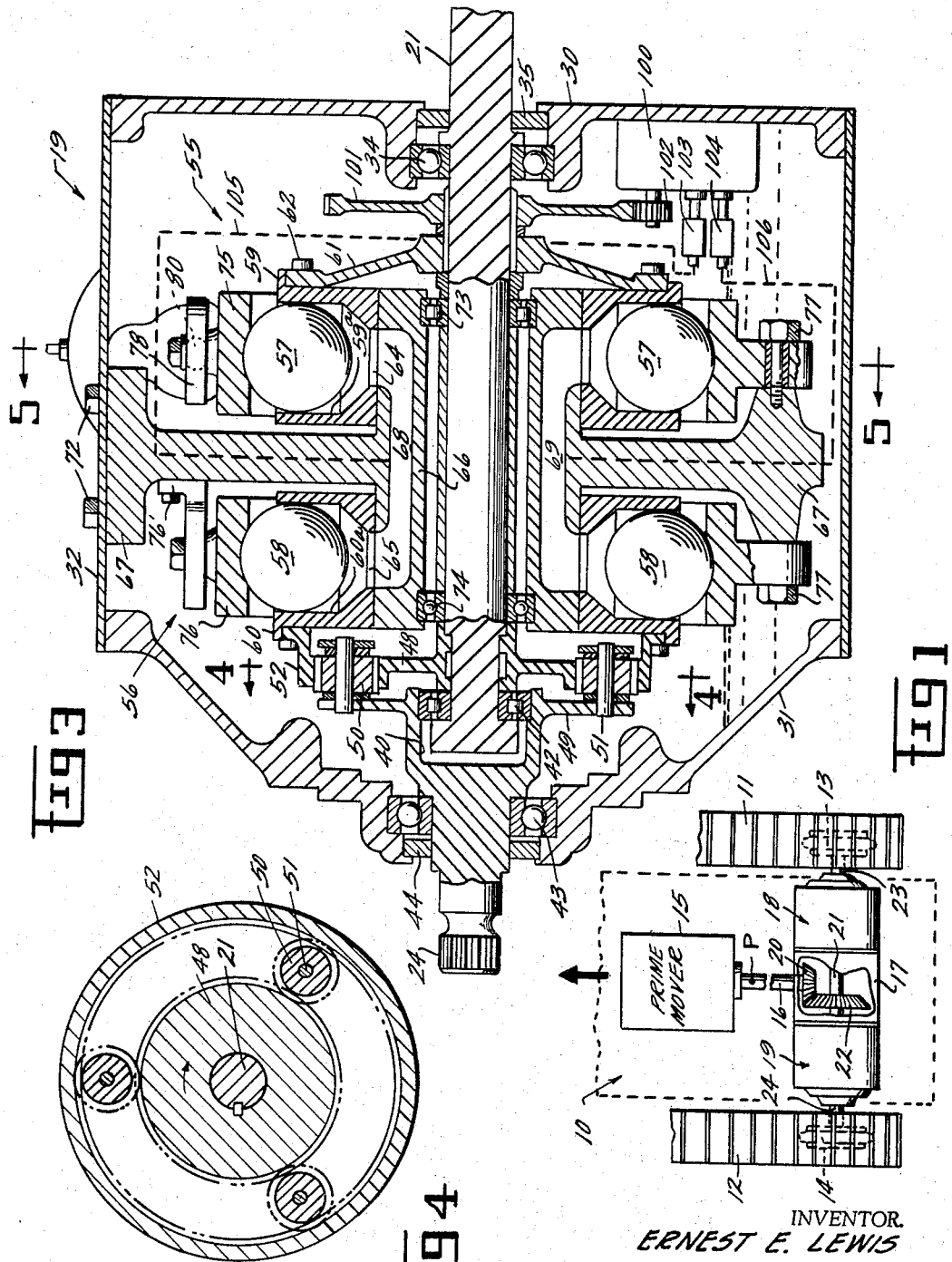

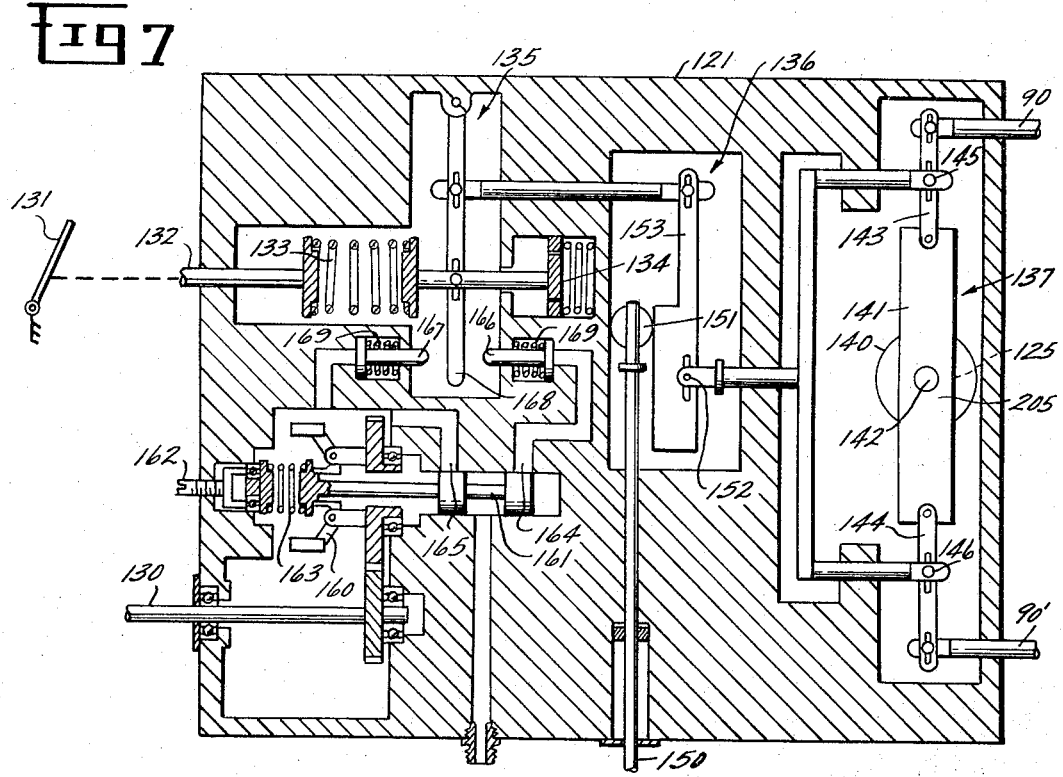
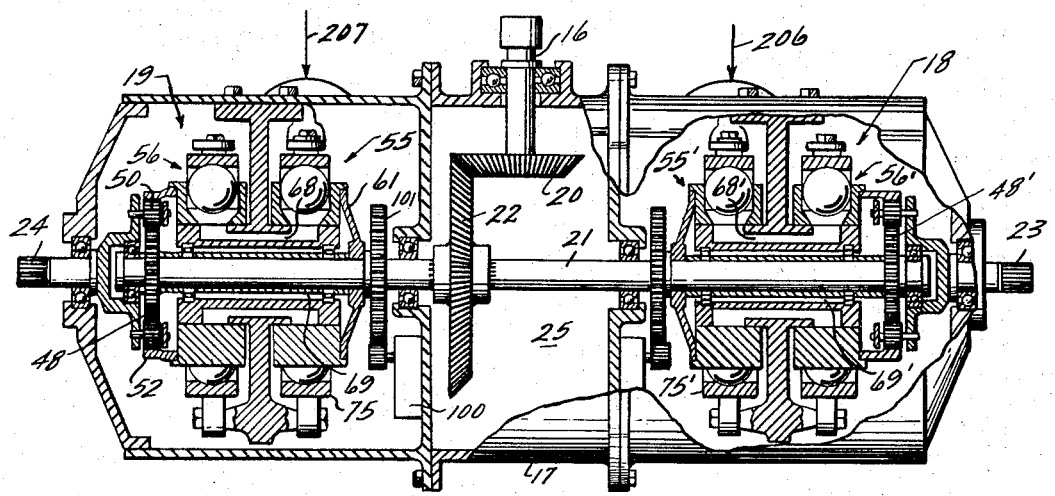

E. E. LEWIS 3,368,425

STEERING AND DRIVING POWER SYSTEM

Filed May 27, 1965

INVENTOR.
ERNEST E. LEWIS
BY
George R. Powers
ATTORNEY

United States Patent Office 3,368,425
Patented Feb. 13, 1968

3,368,425
STEERING AND DRIVING POWER SYSTEM
Ernest Eber Lewis, Topsfield, Mass., assignor to General Electric Company, a corporation of New York
Filed May 27, 1965, Ser. No. 459,319
3 Claims. (Cl. 74—720.5)

ABSTRACT OF THE DISCLOSURE

A steering and driving power system for a vehicle providing independent control of the speed of the traction devices on either side of the vehicle. The prime mover is mechanically connected through drive shafts and gears to the traction devices, and also drives separate hydrostatic transmissions for each side. Planetary gear systems for each side add or subtract the hydrostatic output and the mechanical output to achieve greater forward speeds, reverse speeds and turning.

This invention relates to a steering and driving power system for self-propelled vehicles and, more particularly, to an integrated power system for vehicles in which steering is accomplished by changing the relative speeds of wheels or other traction devices on opposite sides of the vehicle.

Background of the invention

In certain heavy and cumbersome vehicles, particularly tracked vehicles, steering is accomplished by driving the tracks or other traction devices on opposite sides of the vehicle at different speeds, the vehicle turning toward the low speed side. Through suitable control of the relative speeds of the traction devices, an extremely high degree of vehicle maneuverability can be attained. In this respect, various steering control arrangements for making possible a broad range of vehicle movements, including pivot turns about the vehicle's center axis, are well known. For the most part, however, these steering arrangements have certain deficiencies, the chief being that a high degree of overall system efficeincy is not maintained under all normal operating conditions. More particularly, it is typical in such systems to dissipate energy in one form or another during the turning operation.

Apart from the steering function, it is desirable in such vehicles that the power system for driving the vehicle have infinitely variable drive ratio capabilities. Such a system allows the drive ratio to be varied through an infinite number of drive ratios without the disadvantages of shifting or other step changes which can cause rough operation and accompanying wear on the entire power system. This rough operation and wear can be extremely significant in heavy vehicles of the type under consideration because of the high torque levels normally present in such systems. In addition to causing rough operation and wear, step changes through a number of discrete drive ratios cause the prime mover to operate at speeds at which its fuel consumption is substantially greater than optimum for the horepower required to drive the vehicle. Finally, it is desirable that the mechanisms for driving and steering the vehicle be integrated into a power system for accomplishing both functions smoothly and efficiently.

It is therefore an object of this invention to provide an improved power system for both driving and steering vehicles in which steering is accomplished by changing the relative speeds of traction devices on opposite sides of the vehicle.

Another object is to provide for a vehicle an integrated steering and driving power system in which relatively high operating efficiency is attained under all normal operating conditions.

A further object of this invention is to provide an improved power system for steering a tracked or similar vehicle in which steering is accomplished without intentional dissipation of energy during the turning process.

Yet another object is to provide in a steering and driving power system infinitely variable driving and steering capabilities during all modes of operation.

A further object is to provide an integrated steering and driving power system in which both functions are performed smoothly and efficiently throughout the entire operational range of the system.

Summary

In carrying out the invention in one form, a self-propelled vehicle of the type in which steering is accomplished by varying the speeds of wheels or other traction devices has a novel steering and driving power system for transmitting power and torque to the traction devices. The power system may cause the traction devices to run either at the same speeds to produce straight forward or backward motion or at different speeds to produce turning of the vehicle. In accordance with the invention, each traction device is driven from an independent transmission including a reversible hydraulic system comprising normal pump and motor units interconnected by a closed hydraulic circuit by which power may be transmitted between the pump and motor units. The separate transmissions, including the hydraulic pumps, are mechanically interconnected to the prime mover and to each other for reversibly transmitting power not only between the prime mover and the transmissions, but also between the separate transmissions. By varying the displacements of the hydraulic systems, and in particular by varying the displacements of the pump units, the speeds of the motor units may be varied even though the prime mover and the pump units are operating at substantially constant and directly related speeds. The motor unit of each transmission cooperates with the prime mover output drive means through means such as planetary gearing to drive the associated traction device, the speed of the traction device thereby being controlled in accordance with the speed of the motor unit. When the pump units of the separate transmissions have the same displacement, the motor units run at the same speeds and thus cause the vehicle to travel in a straight path. If, however, the separate pump units have different displacements, the motor units and the traction devices will have different speeds and will thus cause the vehicle to turn in the direction of the low speed side. By suitably controlling the displacements of the pump units, various movements of the vehicle may be easily attained.

By a further aspect of the invention, a mechanical drive means directly interconnects the prime mover, the pump units, and the sun gears of planetary gear trains in each transmission, the speed of these interconnected elements during power system operation being directly proportional to the speed of the prime mover. In each of the transmissions, the ring gear of the planetary gear train is directly connected to the motor unit so as to be driven during power system operation at a speed directly proportional to the speed of the motor unit, while the sun gear is driven at a speed directly proportional to the speed of the prime mover. The planet gears are directly connected through their carrier to the traction device to supply power and torque thereto at a speed determined jointly by the speeds of the prime mover and the motor unit acting through the planetary gear train. Control means are provided for controlling the drive ratios of the independent transmission such that the vehicle operator's desires with respect to speed and direction of travel may be satisfied.

Brief description of the drawings

While the invention is distinctly claimed and particularly pointed out in the claims appended hereto, the invention, both as to organization and content, will be better understood and appreciated, along with other objects and features thereof, from the following detailed description when taken in conjunction with the drawings, in which:

FIG. 1 is a schematic view of a tracked vehicle having the power system of this invention;

FIG. 2 is a cross-sectional view of the twin-transmission arrangement of the power system of this invention, the arrangement including two separate transmissions of the type illustrated by FIGS. 3–5;

FIG. 3 is a cross-sectional view of an infinitely variable ratio transmission suitable for use with the present invention;

FIG. 4 is a schematic cross-sectional view taken along the lines 4—4 of FIG. 3;

FIG. 7 is a schematic illustration of a control arrangement for the power system of FIGS. 1 and 6.

Description of the preferred embodiment

Figure 5:
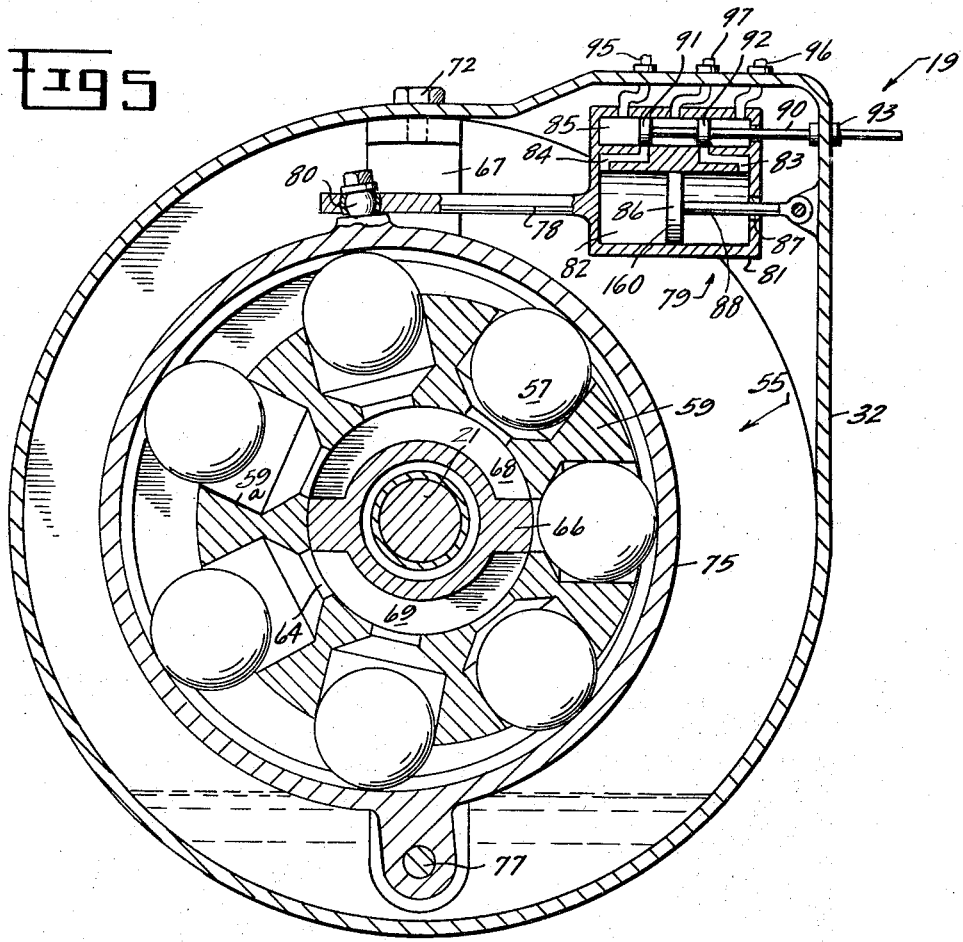
FIG. 5 is a cross-sectional view along the lines 5—5 of FIG. 3 showing a variable pump unit used in the power transmission.

Referring first to FIG. 1, a vehicle 10 is illustrated in outline form by broken lines, the vehicle 10 having continuous tracks 11 and 12 driven by sprockets 13 and 14, respectively. By varying the relative speeds of the tracks 11 and 12, vehicle steering can be accomplished. For example, by driving both tracks at the same speed, the vehicle 10 will travel either forward or backward in a straight path, the direction of travel depending, of course, on the direction of rotation of the sprockets 13 and 14. If, however, one of the sprockets drives the associated track at a speed greater than the speed of the other track, the vehicle 10 will turn toward the low speed side. Thus, if the track 11 is being driven faster than the track 12 and if the general direction of travel is forward as indicated by the arrow in FIG. 1, the vehicle 10 will execute a turn to the left. Right turns can be accomplished by driving the track 12 at a higher speed than the track 11, and similar turns may be executed when the vehicle is traveling in reverse. It will readily occur to those skilled in the art that vehicles propelled in this manner can be extremely maneuverable. For example, the vehicle 10 may be pivoted about its center axis P by driving the tracks 11 and 12 at substantially equal speeds in the opposite directions. In other words, the vehicle 10 is capable of executing turns at a turning radius of zero.

The integrated power system for driving the sprockets 13 and 14 comprises, as illustrated by FIGS. 1 and 2, a prime mover 15 having an output driveshaft 16 extending rearwardly therefrom to a transmission assembly 17 which includes two separate hydrostatic transmissions 18 and 19, one for each sprocket. More particularly, an output shaft 23 connects the sprocket 13 and the transmission 18, the output shaft 23 being capable of transmitting power and torque in either direction between the interconnected elements. Similarly, an output shaft 24 connects the transmission 19 and the sprocket 14 for transmitting power and torque therebetween. With particular emphasis on FIG. 2, the transmissions 18 and 19, which are of the ball piston type, are connected by a common power shaft 21 which is driven by the prime mover driveshaft 16 through a bevel gear train comprising a bevel spur gear 20 fixed to the driveshaft 16 and a bevel ring gear 22 fixed to the power shaft 21, the bevel gear train being located in a compartment 25 between the transmissions. It will thus be seen that the driveshaft 16, the gears 20 and 22, and the power shaft 21 form a mechanical drive train or means interconnecting the prime mover 15 and the transmissions 18 and 19. Because of the direct interconnection of elements, the speeds of rotation of the shafts 16 and 21 are at all times directly proportional to the speed of the prime mover 15. The ball piston transmissions 18 and 19 play an important role in the proper functioning of the power system of this invention. Therefore, before describing the integrated power system and the detailed interactions between the elements of the power system it will be helpful to describe one of the ball piston transmissions.

Referring now to FIG. 3, the ball piston transmission 19 is illustrated. The transmission 19 includes a housing comprising an end bell 31, a side cover 32, and a wall 30 separating the transmission 19 and the bevel gear compartment 25 of FIG. 2. The power shaft 21 extends through the wall 30 and is rotatably supported in a bearing 34 carried by the wall 30. A seal 35 surrounds the shaft 21 to keep dirt and other foreign matter out of the housing and to retain oil or lubricant within the power transmission. The end of the power shaft 21 projects into cavity 40 in the inner end of the output shaft 24, the power shaft 21 being rotatably supported within 24, the end of the output shaft 24 by a bearing 42 providing mutual support between these shafts. The output shaft 24 is also rotatably supported from the end bell 31 by a bearing 43. The support of the shafts 21 and 24 is completed by bearings 73 and 74 in which power shaft 21 runs. A seal 44 also extends between the shaft 24 and the end bell 31 for the same purpose as seal 35. Output shaft 24 is provided with a splined end for attachment to the sprocket 14.

As illustrated by FIGS. 3 and 4, a planetary gear system includes a sun gear 48 fixed to the power shaft 21 for rotation therewith, the rotary speed of the sun gear 48 being at all times equal to the speed of the power shaft 21 and thus directly proportional to the speed of the prime mover. A planet gear support member 49 is carried by the transmission output shaft 24, the planet gear support member 49 supporting three planet gears 50 which engage the sun gear 48. The planet gears 50 may rotate about individual supporting shafts 51 carried by the planet gear support member 49. A ring gear 52 extends around and engages the three planet gears 50. Except when the sun gear 48 and the ring gear 52 are rotating in opposite directions at the same peripheral speeds, a reaction results between the planet gears 50 and the ring gear 52 to cause rotation of the planet gear support member 49 and the output shaft 24. The maximum speed of the output shaft 24 is determined by the particular gear ratio of the planetary gear system, the maximum speed of the ring gear, and the maximum speed of the input shaft 21.

The relative speed of rotation between the power shaft 21 and the output shaft 24 may be varied by varying the relative rotation of the ring gear 52 with respect to the sun gear 48. If, for example, the sun gear 48 is rotated in the clockwise direction as indicated by the arrow on FIG. 4 and the ring gear 52 is held stationary, planet gears 50 will rotate in the counter-clockwise direction so as to cause a clockwise rotation of the planetary gear support 49 and the output shaft 24. However, if the ring gear 52 is accelerated in the counterclockwise direction, the rotation of the planet gears and the output shaft will decrease until the peripheral speed of the gear surface of the ring gear 52 is equal to the peripheral speed of the gear surface of the sun gear 48. When the peripheral speeds of the sun gear 48 and the ring gear 52 are equal, the planet gear support member 49 and the output shaft 24 will remain stationary. Further acceleration of the ring gear 52 in the counterclockwise direction will cause the planet gear support member 49 and the output shaft 24 to rotate in the counterclockwise direction. Similarly, if the ring gear 52 is rotated in the same direction as the sun gear 48, the planet gears 50 will rotate at a peripheral speed equal to the sum of the peripheral speeds of these gears. This will cause a faster rotation of the output shaft 24.

A hydraulic system is provided for controlling the rotation of the ring gear 52, the hydraulic system comprising a variable displacement pump unit 55 and a motor unit 56, the pump unit 55 being further illustrated by FIG. 5. While these units are nominally referred to as being pump and motor units, it should be understood that under certain conditions the functions of the units may be reversed; that is, the motor may act as a pump for supplying power to drive the pump, which will then be acting as a motor. In this respect, the hydraulic system and the units comprising the system may be said to be reversible since the functions of the individual units and the system as a whole are in fact reversible. The units 55 and 56 each include a row of ball pistons 57 and 58, respectively, which may freely reciprocate within cylinder blocks 59 and 60. The pump cylinder block 59 is connected by a flange 61 to the power shaft 21 for rotation therewith at all times at a speed directly proportional to the speed of the prime mover. The flange 61 may be attached to the cylinder block 59 by any suitable means such as bolt fasteners 62; similarly, the cylinder block 60 is attached to and supports the ring gear 52 for rotation. The ball pistons 57 and 58 reciprocate within cylinders 59a and 60a, formed in the cylinder blocks 59 and 60, respectively. As small a clearance as possible is provided between the ball pistons and the cylinders in order to permit free movement of the ball pistons with minimum leakage. Fluid passages 64 and 65 connecting with the cylinders are provided, these passages opening radially inward from the cylinder blocks. As illustrated in FIGS. 3 and 5, the cylinder blocks are rotated about a stationary pintle 66 in which is formed two axially extending fluid passages 68 and 69 which extend partially around the pintle.

Pintle 66 is supported by a pintle support member 67 extending from the housing side wall 32 and secured thereto by bolt fasteners 72. The pintle and pintle support member also support, as mentioned previously, the power shaft 21 for rotation by roller bearings 73 and the ball bearings 74 located between the shaft and pintle. A pump race 75 is pivotally supported from the pintle support member 67 by the bolt 77 with the diametrically opposite side of the race 75 supported by a positioning member or actuating arm 78 extending between the race and a race positioning actuator 79 connected to the race through a ball joint 80. The position of this race 75 may be varied with respect to the cylinder block 59 as will be explained in more detail later while motor race 76 in this embodiment is fixedly supported and eccentrically positioned with respect to the cylinder block 60 by the support member 76' and the bolt 77 extending between the race and pintle support 67.

As illustrated by FIG. 5, the race positioning actuator 79 includes a housing 81 with an internal cylindrical cavity 82 having fluid ports 83 and 84 connecting each respective end of the cavity 82 to another hydraulic control cavity 85. A piston 86 is located for reciprocal movement in the cavity 82 with the positioning rod or member 88 extending through an opening 87 in the housing 81 and having its end pivotally secured to transmission side wall 32. A stroking rod 90 extends through the opening 93 in the housing 32 and into the control cavity 85 with spaced pistons 91 and 92 attached thereto for reciprocal movement within the cavity 85. Fluid outlets 95 and 96 lead to the control cavity 85 with an inlet 97 situated between these outlets. By providing pressured fluid to the inlet 97 and by suitably positioning the stroking rod 90, the fluid introduced into the cavity 85 between spaced pistons 91 and 92 through inlet 97 will enter either of the inlet passages 83 or 84 to flow into the cavity 82 and thereafter force the race positioning actuator 79 to move longitudinally relative to piston 86. This movement of the race positioning actuator 79 moves the actuating arm 78 to pivot the race 75 about the bolt member 77 into an eccentric position with respect to the cylinder block 59. As will be explained later, this provides the pump unit 55 with its variable positive displacement capability.

With reference now to FIG. 3, any hydraulic fluid escaping from the hydraulic system flows to the bottom of the housing to serve both to lubricate the moving parts of the transmission and to act as a reservoir to a pump 100 for replenishing the hydraulic fluid within the hydraulic system. The pump 100 is driven by a gear 102 meshing with gear 101 on the power shaft 21. Check valves 103 and 104 are provided in the respective hydraulic lines 105 and 106 (illustrated as dotted lines) leading to the passages 68 and 69. In this manner, any fluid that needs to be replaced within the hydraulic system may be supplied to the low pressure passage of the pintle 66.

The operation of the hydraulic system will now be described. Turning to FIG. 5 and referring to the positions around the race 75 as numbers on a clock, it will be noted that as the cylinder block 59 rotates the balls 57 are forced outwardly by centrifugal force against the inner surface of the race 75. It should further be noted that as the balls ride along the inner surface of the race 75 the eccentricity of the race with respect to the cylinder block forces the balls to reciprocate within the cylinders 59a. If low pressure hydraulic fluid is introduced into the passage 69 in the pintle and the cylinder block is rotated in a clockwise direction, as the balls progress from the three o'clock position to the nine o'clock position, the cylinders 59a will be filled with the low pressure hydraulic fluid due both to the movement of the balls outwardly in these cylinders creating a low pressure region in the cylinder and also to the pressure of the hydraulic fluid in the passage 69 forcing flow into the cylinders. As the cylinders 59a pass the nine o'clock position, the fluid passageways 64 interconnect the cylinders 59a and the pintle passage 68. With the cylinders now proceeding from the nine o'clock position to the three o'clock position the ball pistons 57 are forced inwardly into the cylinders 59a thereafter forcing fluid out of the cylinders through the ports 64 into the passage 68 at high pressure until the cylinders reach the three o'clock position; thereafter this cycle is repeated every revolution of the cylinder block. By controlling the amount of eccentricity of the ball pump race 75 with respect to the cylinder block, the total amount of fluid pumped by, or the capacity of, the ball pump during one revolution may be regulated; similarly, the position of the race 76 of the motor unit 56 could also be varied, but it is not, of course, in the illustrated embodiment.

If the above described fluid flow is reversed, that is, if pressured fluid is forced into such a hydraulic unit causing the ball pistons to move outward due to the pressure created by the fluid, a reaction will be effected between the balls and the eccentric race to cause relative rotation between the cylinder block and the race. Therefore with the motor unit 56 connected to the pintle passages 68 and 69, the pump unit 55 may be utilized to drive this motor unit and in this manner a continuously variable speed range may be provided between the pump unit 55 and the motor unit 56 by varying the eccentricity of the pump unit 55. If the pump unit 55 and the motor unit 56 have the same capacity, their rotational speed will be the same. With the race 76 of the motor unit 56 fixed, it will be seen that the speed of the motor unit is controlled by the eccentricity of the race 75. If the capacity of the pump unit 55 is greater than that of the motor unit 56, the motor unit 56 must rotate faster than the pump unit 55 to handle the same amount of fluid. Further, by reversing the eccentricity of the pump unit the motor unit may be driven in a reverse direction. It will be noted at this point that the pintle passages 68 and 69 form a closed hydraulic circuit interconnecting the pump unit 55 and the motor unit 56. The entire flow of hydraulic fluid pumped by the pump unit 55 is utilized in driving the motor unit 56. Any fluid which escapes is, of course, replaced through hydraulic lines 105 and 106 as described above.

With the prime mover 15 driving the vehicle 10, the motor unit 56 will be driven by the pump unit 55 in the manner just described. Under certain conditions which will be discussed in detail at a later point in this specification, these being dynamic braking and regenerative steering, the direction of power flow in the hydraulic system may be reversed. In such an event, the motor unit 56 will be mechanically driven from the output shaft 24 and the associated sprocket 14 and will, therefore, drive the pump unit 55. Under such conditions, the flow of power will be from the pump unit 55 to the power shaft 21 through the flange 61. Power may be transmitted through the power shaft 21 to either the prime mover 15 or the other transmission 18 depending upon operating conditions.

Returning now to the description of the ball piston transmission of FIGS. 3–5 and keeping in mind the operation of the hydraulic system and the operation of the planetary gear system as explained heretofore, it can be seen that by controlling the rotation of the motor unit 56 and the ring gear 52, the relative speed of rotation between the power shaft 21 and the output shaft 24 may be varied. The relative speeds of the power shift 21 and the output shaft 24 are controlled in part by the relative sizes of the gears in the planetary gear system. The size of the cylinders 59a and 60a in the hydraulic unit cylinder blocks and the stroke to which the race 75 may be adjusted determine the capacities of the units and hence range of relative speeds of rotation of the pump and motor units and the relative speeds of the sun gear 48 and the ring gear 52. In other words, the drive ratio may be varied by varying the eccentricity of the race 75. Even greater drive ratios may be effected by allowing the positioning of the ball piston motor unit race 76 to be varied. The subject transmission also serves to effect a reversal of the direction of rotation of the output shaft 24 with respect to the power shaft 21 by allowing the pump unit 55 to drive the motor unit 56 and the ring gear 52 in the opposite direction from that of the input shaft. This is done by shifting the eccentric positioning of the race 75 to the opposite side of the cylinder block 59. Further, this rotation in the reverse direction as well as the rotation in the forward direction is continuously variable because the pumping capabilities of the hydraulic pump unit 55 are made continuously variable by shifting the position of the race 75.

More particularly, the eccentricity of the race 75 and, therefore, the transmission drive ratio are controlled in accordance with the positioning of the stroking rod 90 and the pistons 91 and 92 in the control cavity 85. When the positioning member 78 positions the race 75 such that there is no eccentricity, there will be no pumping and therefore no movement of the ring gear 52. As described in detail earlier, the output shaft 24 under these conditions will be driven in the forward direction through the sun gear 48 and the planet gears 50. If a speed increase in the forward direction is called for, the stroking rod 90 will be moved to the right to increase pressure on the left face 160 of the piston 86. This will rotate the race 75 counterclockwise about the bolt 77 to drive the motor unit 56 and the ring gear 52 in the same direction as the power shaft 21 and thus increase the speed of the output shaft 24. This is increasing the drive ratio. Movement of the stroking rod 90 to the left will cause movement of the positioning member 78 to the right, and thus, movement of the race 75 in a clockwise direction about the bolt 77. This decreases the drive ratio until peripheral speed of the ring gear 52 is the same as, but oppositely directed to, that of the sun gear 48. At this point, the output shaft 24 does not rotate. Further clockwise movement of the race 75 will cause reverse motion of the output shaft 24 and the associated vehicle.

With the operation of the ball piston transmission 19 understood, attention is now directed to FIGS. 1 and 2 for a fuller description of the power system. As described previously, the prime mover 15 is connected to the power shaft 21 by bevel gears 20 and 22, the power shaft 21 driving both the pump unit 55 and the sun gear 48 of the transmission 19 during power system operation at a speed directly proportional to the speed of the prime mover. The transmission 18 is substantially identical to the transmission 19, identical elements being indicated by primed numerals. In this manner, pump 55' and the sun gear 48' of the transmission 18 are also driven at all times at speeds directly proportional to the prime mover speed. More particularly, the two sun gears 48 and 48' always rotate at the same speeds and the two pump units always rotate at the same speeds. Assuming that the races 75 and 75' of the pump units 55 and 55', respectively, have the same eccentricity, the motor units 56 and 56' will rotate at the same speed. Consequently, the output shafts 23 and 24 will also rotate at the same speed and the vehicle will be driven either forward or rearward in a straight path. By varying the eccentricities of the two races 75 and 75' equally and in unison, the overall drive ratio of the transmission assembly 17 may be changed so as to drive the vehicle 10 at a new speed. It will be seen that the drive ratio may be infinitely varied since the races 75 and 75' may be positioned in an infinite number of positions; in other words, there are no step changes. If, however, the drive ratio of one of the transmissions is increased while the other is decreased, the sprockets 13 and 14 will be driven at different speeds and the vehicle will be turned. It will be noted that the drive ratios for turning can also be infinitely varied. In this manner, the power system of this invention is capable of smoothly and efficiently driving and steering the vehicle 10.

Figure 6:
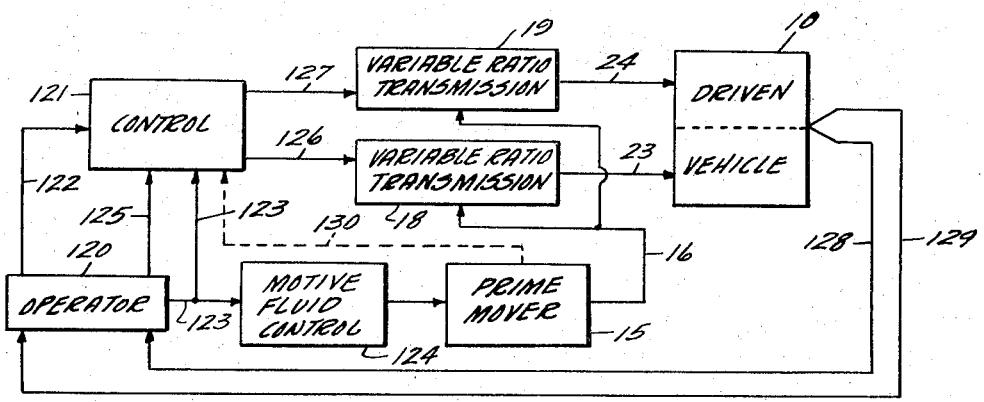
FIG. 6 is a block diagram of the entire power system for indicating schematically the elements and operations of the control system of this invention.

With reference now to FIGS. 6 and 7, a relatively simple control arrangement for the control system is illustrated. In the block diagram of FIG. 6, the system operator 120 signals a control 121 through mechanism represented by line 122 of his desire to go forward, to go in reverse, or to remain in neutral. With the drive signal selected, the operator 120, desiring a certain vehicle speed, then adjusts a throttle accordingly and this feeds a throttle setting signal 123 into both the motive fluid control 124, which is in most cases a carburetor or other fuel metering device, and the control 121. In direct response to the throttle signal 123, the motive fluid control 124 adjusts the motive fluid input to the prime mover 15; in other words, the throttle opening is directly adjusted. The system operator 120 also feeds a direction signal 125 into the control 121. The control 121 includes means responsive to the signals 122, 123, and 125 for producing drive ratio signals 126 and 127 which the control 121 then feeds to the transmissions 18 and 19. Briefly stated, the two drive ratio signals 126 and 127 will be identical whenever the operator's signal 125 indicates that travel in a straight path is desired, and the signals 126 and 127 will call for different output speeds whenever the signal 125 calls for a turn. With the drive ratios set, the sprockets and the tracks are driven through output shafts 23 and 24, thus producing a certain vehicle speed and direction which may be transmitted to the system operator 120 as signals 128 and 129, respectively. The operator may then compare the actual and the desired speed and direction and, if he wishes, modify the signals 123 and 125 accordingly.

The control 121 of FIG. 6 is illustrated in greater detail by FIG. 7. The operator indicates a desired change in the speed of the vehicle by adjusting the position of an accelerator pedal 131, the motion of an accelerator rod 132 connected to the pedal 131 being transmitted into the control 121 through an override spring 133 and being delayed by a dashpot 134 located in series with the spring 133. The purpose of the dashpot 134 is to reduce the system transients which could result if the vehicle operator "tramped" the accelerator pedal 131 down or suddenly released it. Thus, the dashpot 134 provides the necessary smoothing of the input signal. The smoothed motion of the accelerator rod 132 is then transmitted through linkages 135, 136 and 137 to stroking rods 90 and 90' leading to the ball piston pumps 55 and 55', respectively, for varying the drive ratios in accordance with the position of the accelerator pedal 131. Assuming for a moment that the accelerator pedal position is the only input to the control 121, it will be seen that depressing the pedal 131 will cause the stroking rods 90 and 90' to move uniformly in such a direction as to increase the vehicle speed by smoothly shifting speed ratios. Since the rods 90 and 90' move uniformly, the drive ratios of the transmissions 18 and 19 are, of course, equal at all times. The same is true when the accelerator pedal 131 is released.

A geared down steering input signal 125 is provided to the control 121 through a double acting torsional spring 140 which provides "steering feel" for the operator. The steering input pivots a steering lever 141 about a pivot point 142, the amount of pivoting of the lever 141 being directly proportional to the amount of steering input by the operator. This movement of the steering lever 141 causes stroking rod levers 143 and 144 to pivot about points 145 and 146, respectively, to cause equal and opposite motion of the stroking rods 90 and 90'. As a result, one drive sprocket slows down and the other speeds up since the equal and opposite motion of the stroking rods causes corresponding changes in the drive ratios of the transmissions 18 and 19. From the foregoing, it will be seen that an infinitely variable turning radius may be achieved, including the ability to make pivot turns.

With reference now to the linkage 136, the drive selector mechanism will be described. The drive selector mechanism includes a selector rod 150 having a roller 151 mounted thereon, the selector rod 150 and the roller 151 being movable between a forward drive position as illustrated, an intermediate neutral position, and a reverse position. With the selector rod 150 and the roller 151 in the forward position, the operation of the control 120 is as heretofore described. If, however, the roller 151 is moved to the neutral position, changes in accelerator pedal position have no effect since the roller 151 is aligned with the pivot 152 on the drive link 153. Even though changes in position of the accelerator pedal 131 are not transmitted to the transmissions when the selector is in neutral, steering changes are transmitted since the steering input 125 is not transmitted through the linkage 136. In this manner, pivot turns can be accomplished while the control is in neutral. When the roller 151 is in its reverse position (below pivot 152), accelerator position is transmitted through the linkage 136 to the stroking rods 90 and 90', but the direction of movement is reversed from that when the roller 151 is in the forward position since the roller 151 is located on the opposite side of the pivot 152.

An engine speed signal 130 (see FIG. 6) is transmitted from the prime mover 15 to a fly-weight governor 160 in the control 121. The output motion of the governor 160 drives a spool valve 161. The position of the spool valve 161 for a given engine speed is externally adjustable by a screw 162 for changing the preload on a governor reference spring 163. A non-operational deadband is built into the spool valve 161 by means of overlap between the spool valve 161 and the output ports 164 and 165. This provides that there will be no control operation from this input for given plus or minus speed variations about the governor's set speed. This non-operational speed band corresponds to the normal speed range of the prime mover so that prime mover speed normally has no effect on transmission drive ratios.

The output ports 164 and 165 of the spool valve 161 are connected to two single ended spring loaded pistons 167 and 166 which provide over-speed and anti-stall protection, respectively. Piston 167 is energized by an over-speed signal from the governor and the piston 166 is energized by an under-speed signal. The pistons 166 and 167, when energized, move out and pick up an extension 168 of the input linkage 135 and override the primary signal from the accelerator pedal 131. During operation on these limits, motion of the limit pistons 166 and 167 is transmitted to the stroking rods 90 and 90' in the same manner as that of the accelerator pedal rod 132. When the hydraulic signal is removed from either of the limit pistons 166 and 167, they are returned to their "stored" positions by the loading springs 169.

There are two important aspects to the power system of this invention which will now be discussed, these being dynamic braking and regenerative steering. If the operator wishes to slow the vehicle, he may release the accelerator pedal 131 and thus call for a lower drive ratio from both transmissions 18 and 19 as well as reducing the fuel flow to the prime mover which will tend to slow very rapidly. Because of the dashpot 134, the change in drive ratios, however, occur rather slowly. Even so, the change in the drive ratios will generally occur at a faster rate than the normal slowing rate of the vehicle. Consequently, since there is a given relationship between vehicle speed and prime mover speed at any given drive ratio, the prime mover will be driven by the stored momentum of the vehicle during much of the time in which the vehicle is being slowed. In this manner, the prime mover becomes a power dissipating means when the accelerator is released. The prime mover thus helps decelerate the vehicle. With the power system providing dynamic braking instead of merely shifting into "neutral," the vehicle may be quickly brought to a stop without excessive manual braking. This is an extremely important factor when the power system is used on heavy tracked and similar vehicles where, in the absence of satisfactory dynamic braking, the problems associated with stopping the vehicle can be formidable.

The novel power system of this invention also permits regenerative steering as a special case of dynamic braking. With reference to the various figures, assume that the operator wishes to make a left turn while maintaining the vehicle's overall speed. The steering input 125 to the control 121 will modify the drive ratio output through the stroking rods 90 and 90' such that the drive ratio of the transmission 19 will be reduced and the drive ratio of the transmission 18 will be increased. As a result, the sprocket 14 and the track 12 will slow down while the sprocket 13 and the track 11 will speed up. During this period, the prime mover 15 continues to supply power through the driveshaft 16 and the power shaft 21 to both transmissions. Since the power is not required by the sprocket 14, and since the pump unit 55 and the motor unit 56 are hydraulically reversible, the excess power supplied to the sprocket 14 through the shaft 21 and the sun gear 48 is transmitted to the motor unit 56, which acts as a pump by driving the pump unit 55. In this manner, the excess power is returned to the power shaft 21 through the flange 61 and is transmitted through the power shaft 21 to the transmission 18 where the power may be utilized to drive the sprocket 13 and the track 11. It will thus be seen that the power system of this invention accomplishes steering without intentional dissipation of energy during the turning process.

As previously stated, the control arrangement described above is relatively simple. There is, of course, no reason why the novel driving and steering arrangement of this invention cannot be used in conjunction with more advanced control arrangements. For example, in a copending patent application entitled, "Power System Control," Ser. No. 424,872, filed Dec. 14, 1964, now U.S. Patent 3,292,449, in the names of Ernest E. Lewis and Charles A. Maher, and assigned to the assignee of this invention, there is described a control in which the actual prime mover speed is continuously compared with a prime mover speed required to produce a required power ouput at minimum specific fuel consumption. The control continuously adjusts the transmission drive ratio until the actual prime mover speed is equal to the required prime mover speed. In this manner, the power system continuously operated at a condition of optimum fuel consumption. It would be an easy matter for one skilled in the art to adapt such a control system to the driving and steering arrangement of this invention. Other control arrangements will also be obvious to those skilled in the art.

It will thus be seen that the power system of this invention provides in an integrated arrangement both driving and steering power for a vehicle in which steering is accomplished by changing the relative speeds of traction devices on opposite sides of the vehicle. Furthermore, the power system performs both functions smoothly and efficiently through infinitely variable drive ratio transmissions. In addition, the power system provides both dynamic braking and regenerative steering.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What is claimed as new and is desired to secure by Letters Patent of the United States is:

1. In a self-propelled vehicle having traction devices on opposite sides thereof, a steering and driving power system for transmitting power and torque to said traction devices, said power system comprising:
   a prime mover,
   a first transmission including a first hydraulic system and a first gear train connected to a first traction device on a first side of the vehicle for driving said first traction device,
   a second transmission including a second hydraulic system and a second gear train connected to a second traction device on a second side of the vehicle for driving said second traction device,
   mechanical drive means interconnecting said prime mover and said first and second transmissions for transmitting power and torque therebetween,
   each of said first and second gear trains comprising first, second, and third meshing gear elements,
   each of said first and second hydraulic systems comprising a reversible hydraulic pump unit of variable displacement directly coupled to said mechanical drive means, a reversible hydraulic motor unit of fixed displacement and a closed hydraulic circuit interconnecting said pump and motor units for the transmission of power therebetween,
   each of said first gear elements directly coupled to said mechanical drive means for rotation therewith,
   each of said second gear elements directly coupled to the associated motor unit for rotation therewith,
   each of said third gear elements directly coupled to the associated traction device for supplying output torque and power thereto,
   means to generate a throttle signal indicating a desired throttle setting of said prime mover,
   means to generate a signal indicating a desired direction of travel of the vehicle,
   means responsive to said throttle signal and to said direction signal to generate first and second drive ratio signals,
   and means responsive to said first and second drive ratio signals to adjust separately the displacements of said first and second pump units, respectively, so as to infinitely vary the drive ratios at which power and torque are supplied to said first and second traction devices.

2. In a self-propelled vehicle having traction devices on opposite sides thereof, a steering and driving power system for transmitting power and torque to said traction devices, said power system comprising:
   a prime mover,
   a first planetary gear train comprising a sun gear, a planet gear, and a ring gear associated with a first traction device on a first side of the vehicle,
   a second planetary gear train comprising a sun gear, a planet gear, and a ring gear associated with a second traction device on a second side of the vehicle,
   first and second reversible hydraulic ball piston pumps mounted for rotation,
   first and second means for varying the positions of the ball piston races so as to vary the displacements of said first and second pumps, respectively,
   first and second reversible hydraulic ball piston motors of fixed displacement mounted for rotation,
   first and second closed hydraulic circuits interconnecting the first ones and the second ones, respectively, of said pumps and motors for reversibly transmitting power therebetween,
   the relative speed of each of said ball piston motors with respect to the associated ball piston pump during power system operation being dependent on the displacement of said pump,
   mechanical drive means directly interconnecting said prime mover, the sun gears of first and second planetary gear trains, and said first and second ball piston pumps for reversibly transmitting power and torque between said interconnected elements, the speed of said interconnected elements during power system operation being directly proportional to the speed of said prime mover,
   said first ball piston motor directly connected to the ring gear of said first planetary gear train and said second ball piston motor directly connected to the ring gear of said second planetary gear train, the speed of each of said ring gears during power system operation being directly proportional to the speed of the ball piston motor connected thereto,
   said first traction device being directly connected to the planet gear of said first planetary gear train for reversibly transmitting power and torque therebetween and said second traction device being directly connected to the planet gear of said second planetary gear train for reversibly transmitting power and torque therebetween,
   means to generate a throttle signal indicating a desired throttle setting of said prime mover,
   means to generate a signal indicating a desired direction of travel of the vehicle,
   means responsive to said throttle signal and to said direction signal to generate first and second drive ratio signals,
   and means responsive to said first and second drive ratio signals separately connected to said first and second race positioning means to adjust continuously the displacements of said first and second ball piston pumps, respectively, until the actual prime mover speed is equal to the required prime mover speed, whereby desired steering is attained with the prime mover operating at a condition of optimum motive fluid consumption.

3. A power system comprising:
   a prime mover,
   a plurality of planetary gear trains each comprising a sun gear, a planet gear, and a ring gear,
   a plurality of reversible hydraulic pumps mounted for rotation,
   a plurality of means for varying the displacements of respective ones of said pumps,
   a plurality of reversible hydraulic motors mounted for rotation,
   a plurality of closed hydraulic circuits interconnecting respective pairs of said pumps and motors for reversibly transmitting power therebetween, the relative speed of each of said motors with respect to the associated pump during power system operation being dependent on the displacement of said pump, mechanical drive means directly interconnecting said prime mover, the sun gears of said planetary gear trains, and said pumps for reversibly transmitting power and torque between said interconnected elements, the speed of said interconnected elements during power system operation being directly proportional to the speed of said prime mover, each of said motors being directly connected to the ring gear of a respective one of said planetary gear trains, the speed of each of said ring gears during power system operation being directly proportional to the speed of the motor connected thereto, a plurality of independent output means each connected to the planet gear of a respective one of said planetary gear trains for reversibly transmitting power and torque therebetween, means to generate a throttle signal indicating a desired throttle setting of said prime mover, means to generate a signal indicating a desired speed relationship between said independent output means, means responsive to said throttle signal and to said speed relationship signal to generate a plurality of drive ratio signals, and means responsive to said plurality of drive ratio signals and separately connected to said plurality of displacement varying means for infinitely varying the displacement of each of said pumps so as to infinitely vary the drive ratios at which power and torque are supplied to said output means.

References Cited

UNITED STATES PATENTS

| | | | |
|---|---|---|---|
| 2,336,911 | 12/1943 | Zimmermann | 74—687 |
| 2,336,912 | 12/1943 | Zimmermann | 74—720.5 |
| 2,393,557 | 1/1946 | Orshansky | 74—687 |
| 2,580,946 | 1/1952 | Orshansky et al. | 74—687 |
| 2,596,968 | 5/1952 | Harris et al. | 180—6.48 |
| 2,774,434 | 12/1956 | Ferris | 180—6.48 |
| 2,874,591 | 2/1959 | Thoma | 74—720.5 |
| 2,901,922 | 9/1959 | Baker | 74—687 |
| 2,975,655 | 3/1961 | Cox. | |
| 3,065,700 | 11/1962 | Blenkle | 180—6.48 |
| 3,234,856 | 2/1966 | Martin | 180—6.48 |

FOREIGN PATENTS

| | | |
|---|---|---|
| 720,622 | 11/1965 | Canada. |
| 737,675 | 7/1966 | Canada. |
| 1,378,683 | 10/1964 | France. |
| 747,763 | 10/1964 | Germany. |

DONLEY J. STOCKING, *Primary Examiner.*

ARTHUR T. McKEON, *Examiner.*

J. R. BENEFIEL, *Assistant Examiner.*